United States Patent [19]

Brownstein

[11] Patent Number: 4,603,966
[45] Date of Patent: Aug. 5, 1986

[54] FILM VIDEO PLAYER/PRINTER WITH CROPPING CONTROL

[75] Inventor: Scott A. Brownstein, Rochester, N.Y.

[73] Assignee: Eastman Kodak Company, Rochester, N.Y.

[21] Appl. No.: 770,121

[22] Filed: Aug. 28, 1985

[51] Int. Cl.⁴ .................... G03B 13/28; H04N 7/18
[52] U.S. Cl. .................................. 355/45; 355/20;
    355/43; 358/54; 358/93; 358/102; 358/225;
    354/76
[58] Field of Search ............ 358/302, 227, 54–56,
    358/225, 93, 102, 96; 355/43, 45, 20; 354/76

[56] References Cited

U.S. PATENT DOCUMENTS

| | | | |
|---|---|---|---|
| 2,968,215 | 1/1961 | Goodman | 355/20 X |
| 3,345,458 | 10/1963 | Cole et al. | 340/750 |
| 3,459,888 | 8/1969 | Sokolov | 355/20 |
| 3,728,481 | 4/1973 | Froehlich et al. | 358/96 |
| 3,794,756 | 2/1974 | Hahn et al. | 355/20 X |
| 3,824,336 | 7/1974 | Gould et al. | 358/227 X |
| 4,121,245 | 10/1978 | Hibbard | 358/102 |
| 4,482,924 | 11/1984 | Brownstein | 358/302 |
| 4,485,406 | 11/1984 | Brownstein | 358/227 |
| 4,495,516 | 1/1985 | Moore et al. | 358/54 |
| 4,506,300 | 3/1985 | Fearnside | 358/225 |

FOREIGN PATENT DOCUMENTS

| | | |
|---|---|---|
| 0149196 | 12/1984 | European Pat. Off. . |
| 0149257 | 12/1984 | European Pat. Off. . |
| 58-100124 | 6/1983 | Japan . |

*Primary Examiner*—Richard A. Wintercorn
*Attorney, Agent, or Firm*—Dennis P. Monteith

[57] ABSTRACT

A film video player/printer provides for cropping a photographic film by displaying the film image on a video monitor, the display consisting of not only the image to be included in an optical print but the image to be excluded, just off the print. Reticle-generating circuitry serves to display and to rotate a given rectangular reticle centered within the border of the image displayed, the perimeter and the orientation of the reticle defining respectively the portion of the image to be printed and the format of the print to be made. To further facilitate cropping, border logic and control circuitry, operable prior to a photographic printing operation, serves for blanking-out the portion of the image displayed outside of the reticle, so that the video image temporarily corresponds exactly to the print to be made.

9 Claims, 6 Drawing Figures

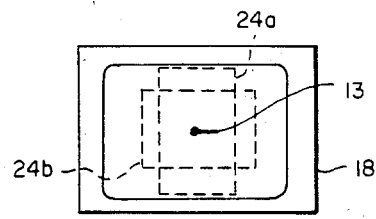
FIG. 2
FIG. 3
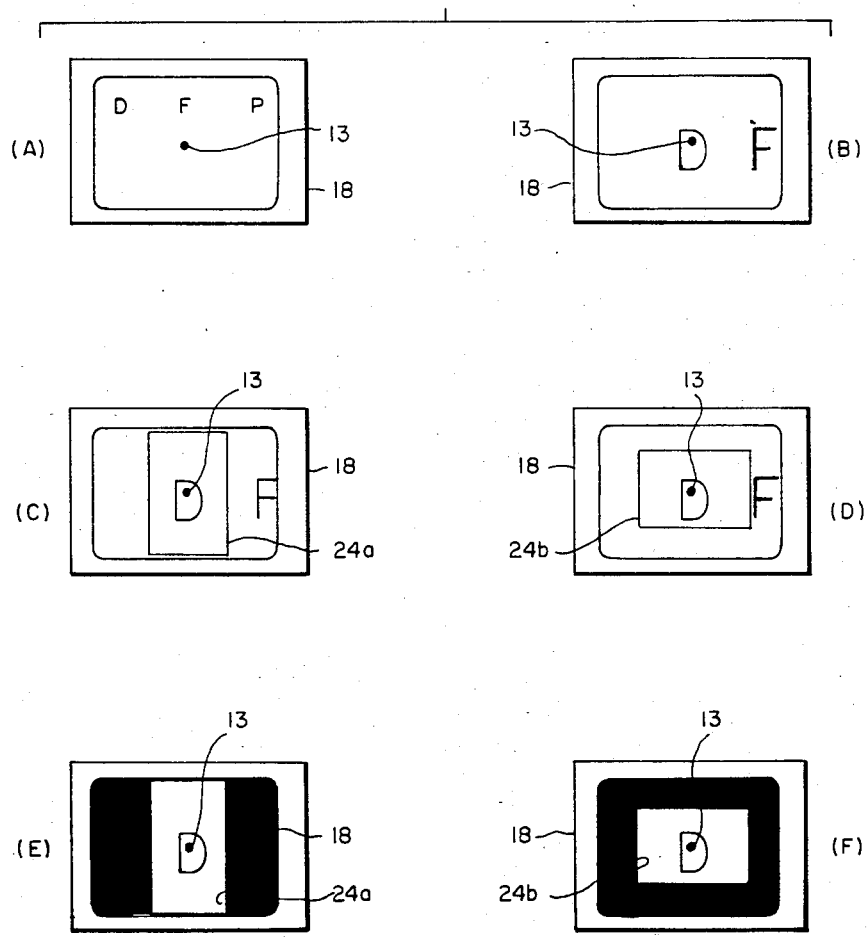

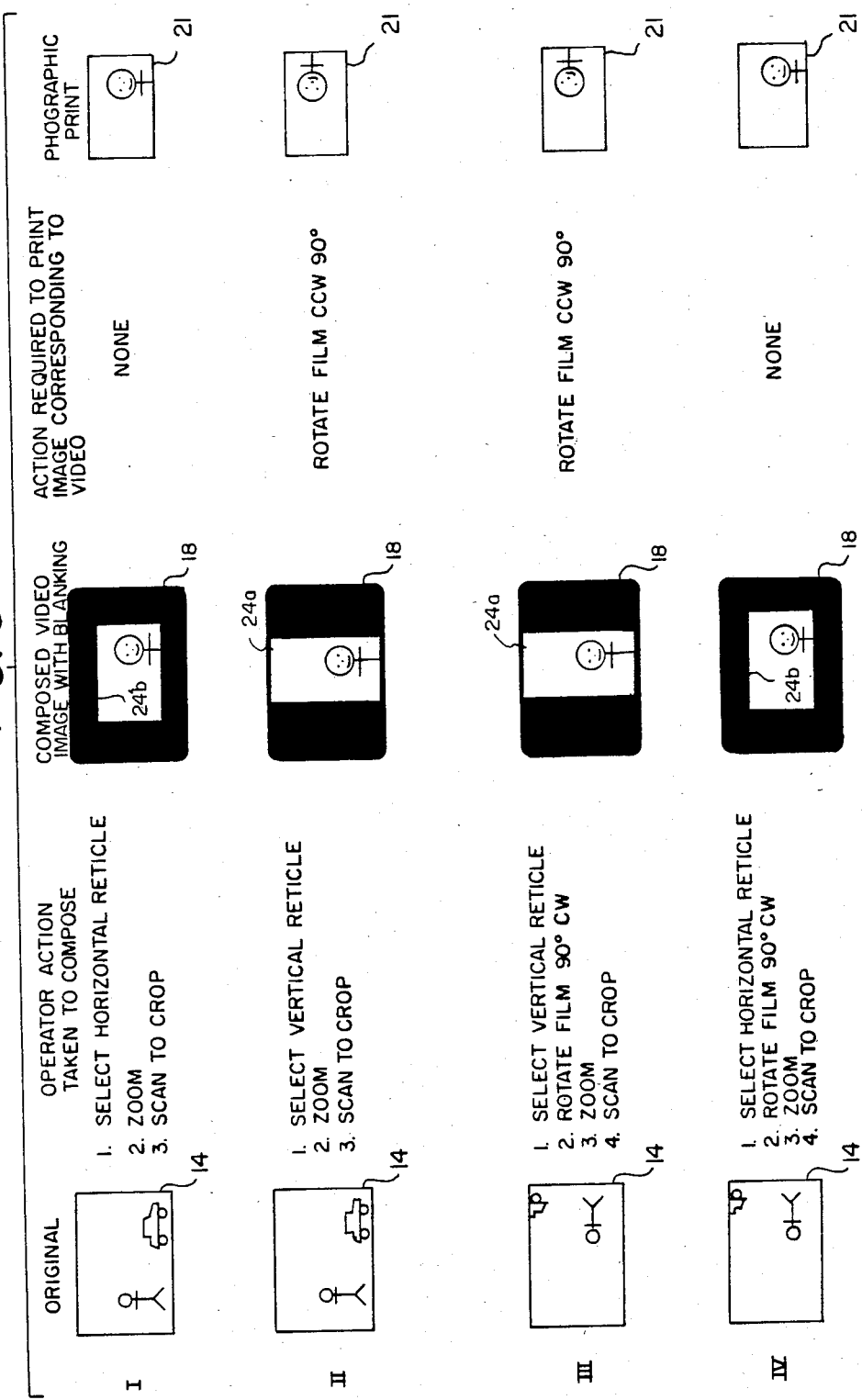

FILM VIDEO PLAYER/PRINTER WITH CROPPING CONTROL

CROSS-REFERENCE TO A RELATED APPLICATION

Reference is hereby made to U.S. patent application Ser. No. 770,120 entitled Film Video Player/Printer by M. Di Pietro et al, filed Aug. 28, 1985.

BACKGROUND OF THE INVENTION

1. Field of the Invention

The present invention relates to a film video player/printer. More particularly, the invention relates to a film video player/printer for facilitating the composing of an optical print, based on a film image shown on a video display.

2. Description Relative to the Background Art

Cropping is a photographic printing technique in which a photofinisher effectively eliminates a portion of a photographic original, e.g. color negative film, in order to print only a specific portion of the original image. A professional photographer routinely uses cropping and other photofinishing techniques, such as making prints in one format (either horizontal or vertical) from an original in the opposite format, to print pictures of maximum interest and visual impact. Amateur photographers, who do their own printing, likewise employ cropping and format converting to improve their prints.

A commercial photofinisher makes these services available to improve customer prints, but the services are used infrequently with mixed results. A photographic customer encounters a problem in identifying to the photofinisher exactly what part of the original is to appear in the print. The problem is aggravated, of course, because the customer often has not had the benefit of seeing either the original or a sample print.

It is believed that photographic prints could be improved considerably if customers were provided with a convenient way of composing a picture, cropped as desired, in either or both formats, prior to deciding upon the final print format and composition.

U.S. Pat. No. 4,482,924, which is assigned to the assignee of the present invention, discloses a photographic system comprising a printer for use with a film video player. A video player control panel serves for magnifying a photographic film image and for cropping the film by selectively displaying only a portion of the magnified image on a video monitor such as a standard television receiver. When the video display is composed as desired, a recorder applies coded magnetic indicia to the film, specifying the selected magnification and cropping coordinates. The printer of the system includes a magnetic reader for reading the coded indicia, to provide for the proper printing position and magnification of the film, to make an optical print of the film corresponding to the "cropped" image filling the video monitor.

Although the system of U.S. Pat. No. 4,482,924 provides a convenient way of displaying and composing the portion of a film image to be printed, to crop the original requires that the "deleted" portion of the image not be displayed. As the magnification and/or the cropping of the film image increases, the display shows a progressively smaller portion of the overall image. An operator may lose the perspective of the picture as less of the film image is displayed, thereby making it more difficult to compose an image of maximum effectiveness. Furthermore, the aspect ratio of a standard television screen (vertical dimension to horizontal dimension) is approximately 3:4. When the full screen shows a film image in a normal viewing orientation, the display portrays the image only as it would appear in a horizontal print format.

SUMMARY OF THE INVENTION

A properly composed picture can capture the essence of a photographic scene. For example, although a tightly cropped portrait can be both dramatic and intimate, there are times when a broader view conveys more—a person's stance or the way arms are held often provides a valuable insight into character. A full-length portrait, on the other hand, can seem impersonal, because of the distance between subject and viewer, and because the face, which is the most important part of the body, forms only a small part of the image.

A half-length picture, cropped at the waist or below, can be the perfect compromise. It includes a little of the subject's clothing and surroundings, but still shows subtleties of facial expression.

In composing a picture, special attention should be paid to the edges of a frame and scene highlights—the most important areas of a photographic picture. If too much is included—perhaps by cropping above the ankles—the crop may appear to be in error. When cropping is tighter, however, the risk is run of lopping off a highlight, for example hands—the most important element in a portrait other than the face itself. In cropping an original to compose any particular print, cropping is facilitated by viewing not only what is to be included in the print, but by viewing what is to be excluded.

In view of the foregoing and the prior art, it is an object of the invention to provide a film video player/printer for facilitating the customizing of an optical print, the player/printer allowing an operator to selectively crop a film image according to a desired video display, while viewing a video image extending beyond the actual image corresponding to the print to be made.

This object is achieved by providing electronic display means for selectively displaying a given rectangular reticle within the border of a film image displayed on a video monitor, the perimeter of the reticle encompassing the portion of the film image displayed that is to be printed.

Under operator control, the film image to be printed is arranged, within the reticle, in a normal viewing orientation, perhaps by rotating the film image, depending on its format, and by selectively magnifying and translating the film image vertically and horizontally relative to the video monitor. Under the control of an operator print command, a microprocessor-based control means causes a printer to make an optical print corresponding to the image encompassed by the reticle.

To maintain the perspective of the film image, the video display includes the "cropped" portion of the film image—image portion not to be printed—outside the reticle, as well as the image portion to be printed, inside the reticle. With this arrangement, when either too much of the image is included or excluded (with respect to the reticle), it is more likely that the crop may appear to an operator to be in error, and thereby corrected, before a print is made.

In a further feature of the invention, the electronic display means, in response to input supplied by the operator, serves for rotating the rectangular reticle about an optical centerline, the orientation of the reticle, vertical or horizontal, defining the format of the print to be made. Under the control of the print command, the microprocessor-based control means then selectively rotates the film, as a function of the orientation of the reticle selected, to cause the printer to make the print corresponding not only to the image surrounded by the reticle, but a print in a format portrayed by the orientation of the reticle.

The object of the invention is further achieved by providing means for blanking-out the display outside of the reticle, before a print is made, to let the operator know exactly which portion of the image displayed is to be printed. This "blanking-out" provides a different perspective of the video display, to thereby further assist the operator in evaluating the effectiveness of the crop, in light of the video image corresponding precisely to the print to be made.

In a preferred embodiment of the invention, the film video player/printer includes a solid state image sensor for displaying a film image on the video monitor, the image sensor and the printer having a common optical axis. A zoom lens functions to magnify and minify the film image, and an X-Y translation state serves to move the film horizontally and vertically, for cropping the magnified image displayed. A rotatable platform serves to selectively rotate the film about the aforementioned optical centerline of the film video player/printer, independently of the X-Y translation stage, either to provide for the video display in the normal viewing orientation or to provide for a print of the desired format.

By rotating the film about the optical centerline, the print to be made corresponds to the image within the reticle selected, without the need to adjust the X-Y translation stage subsequent to any rotation of the film for printing. The aspect ratio of the horizontal reticle is, of course, the reciprocal of the aspect ratio of the vertical reticle. This feature further reduces the complexity of the player/printer, because it permits the making of the print, without the need to reset the zoom lens following any rotation of the film for printing.

The invention and its other advantages will become more apparent in the detailed description of a preferred embodiment presented below.

DESCRIPTION OF THE DRAWINGS

The invention will be described with reference to the accompanying drawings, in which:

FIG. 2 shows a video monitor of the film video player/printer apparatus having a reticle display thereon;

FIGS. 3(a through f) includes drawings illustrating the use of the video monitor of FIG. 2;

FIG. 6 is a drawing illustrating various photographic originals, and the player/printer operations required to make a desired photographic print correponding to the video display.

DETAILED DESCRIPTION OF A PREFERRED EMBODIMENT

Figure 1:
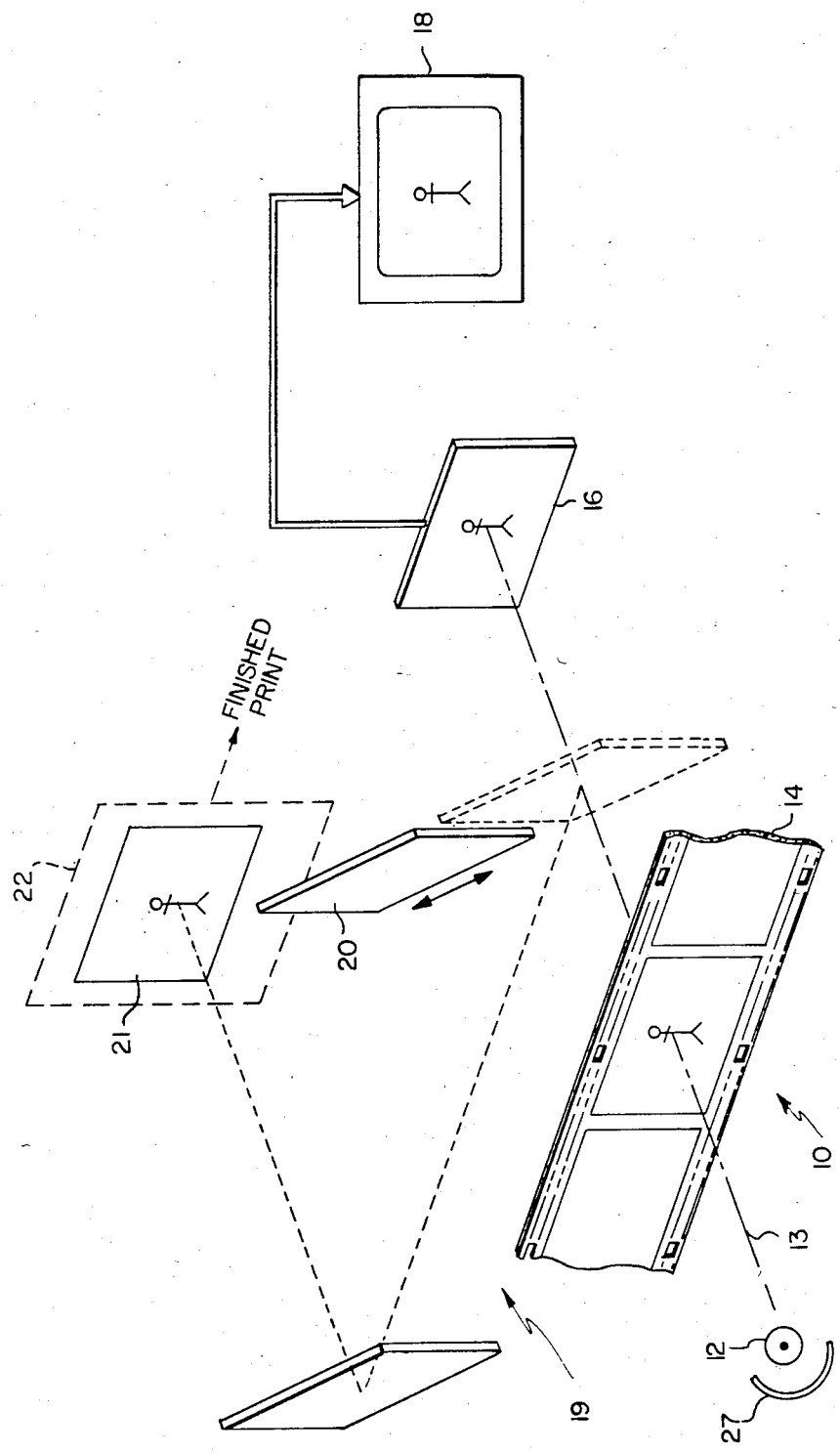
FIG. 1 is a general schematic showing a unitary film video player/printer apparatus.

FIG. 1 illustrates generally a unitary film video player/printer 10. In a video display mode, a light source 12 serves to project light along an optical centerline 13, to illuminate a frame of a color negative photographic film 14, and to project the illuminated image onto a solid state image sensor 16. The sensor 16, in response to the image projected, produces in a known manner a signal which is processed (by means not shown) to produce a positive color video signal. A video monitor 18, such as a standard television receiver, receives the video signal and produces a positive display of the film image.

In a photographic print mode, optical means 19, including a movable mirror 20, serves to direct the illuminated image onto a photographic print material 21 of a printer 22, which delivers a finished photographic print of a customer.

With the apparatus of FIG. 1, a film image in a horizontal format, as shown, is automatically displayed in a normal operator-viewing position. As used herein, the term "viewing position" is synonymous with "viewing orientation".

With a film image in a vertical format, the corresponding video image would be rotated 90°. Similarly, in order to make a photographic print of vertical format corresponding to a "normally oriented" video image, it is necessary to effect a relative rotation of 90° between the film image and the print material. To minimize the complexity of the player/printer 10, a mechanism, as described in detail hereinbelow, serves to rotate the film by 90°, to provide a print of vertical format and to display a film image of vertical format in a normal viewing orientation.

The film video player/printer 10 allows an operator to control the magnification of the film image and the portion of the magnified image that is displayed on the monitor 18. When a desired composition is achieved, the printer 22 produces an optical print corresponding to the image arrangement displayed on the monitor 18. A problem faced with providing this cropping feature is to allow the operator to compose the film image according to a desired video display, while viewing an overall greater video image of the film—one that extends beyond the actual image corresponding to the desired print to be made.

To that end, a presently preferred embodiment of the invention includes electronic display means for selectively displaying a given rectangular reticle within the border of the film image displayed on the video monitor 18. The perimeter of the reticle encompasses the portion of the image displayed that is to be printed. The image outside of the reticle permits the operator to view the portion of the film image which would be just off the print to be made. By viewing that which is to be included in the print along with that which is to be excluded, the operator is more able to evaluate the effectiveness of the crop.

In a further feature of the invention, the electronic display means serves for rotating the reticle about the center of the monitor 18, the orientation of the reticle, vertical or horizontal, defining the format of the video display; thus, the reticle, which outlines the border of the image to be printed, also defines, by means of its orientation, the format of the print to be made.

FIG. 2 illustrates the screen of the video monitor 18 having a reticle 24(a,b) displayed thereon. In this figure, the vertically oriented reticle 24a corresponds to a vertical print format, and the horizontally oriented reticle 24b corresponds with a horizontal print format. So that a print to be made corresponds to the image displayed within whichever reticle is selected, the areas of each reticle are equal; also, the ratio of the short dimension to the long dimension of each reticle is the same as the aspect ratio of the photographic film being used. For example, with 35 mm film, the ratio of the short to the long dimension of each reticle is 2:3. Preferably, the height of the vertical reticle 24a just fills the short dimension of a standard television screen.

Reference should now be had to FIGS. 3(a through f): The screen of the video monitor 18 of FIG. 3a includes an image (D F P), corresponding to a frame of a photographic film. After the film image is magnified and is moved horizontally to the right and vertically downward, relative to the optical centerline 13 of the film video player/printer 10, the video image may now appear as shown in FIG. 3b. When a vertical print is to be made only of the image D of FIG. 3b, the screen of the monitor 18 would include the reticle 24a, as shown in FIG. 3c, to portray the video image in a vertical format. Likewise, when a horizontal print is to be made of D, the screen would include the reticle 24b, as shown in FIG. 3d, to portray the image in a horizontal format.

The presently preferred embodiment of the invention further includes the feature of providing means for blanking-out the video display outside of the reticle, before a print is made. With this arrangement, an operator is shown only that portion of the video image to be printed—without the display including the image portion to be excluded. As shown in FIG. 3e and FIG. 3f, when the image beyond the reticle is blanked (black-level blanking), a different perspective of the video display is presented, to thereby further assist the operator in evaluating the print to be made.

To make a print corresponding to the image within the reticle 24a of FIG. 3e, requires that the film first be rotated 90°. For that purpose, the film 14 is rotated about the optical centerline 13 of the film video player/printer 10. To make a print according to the display of FIG. 3f, requires, on the other hand, no rotation of the film.

Figure 4:
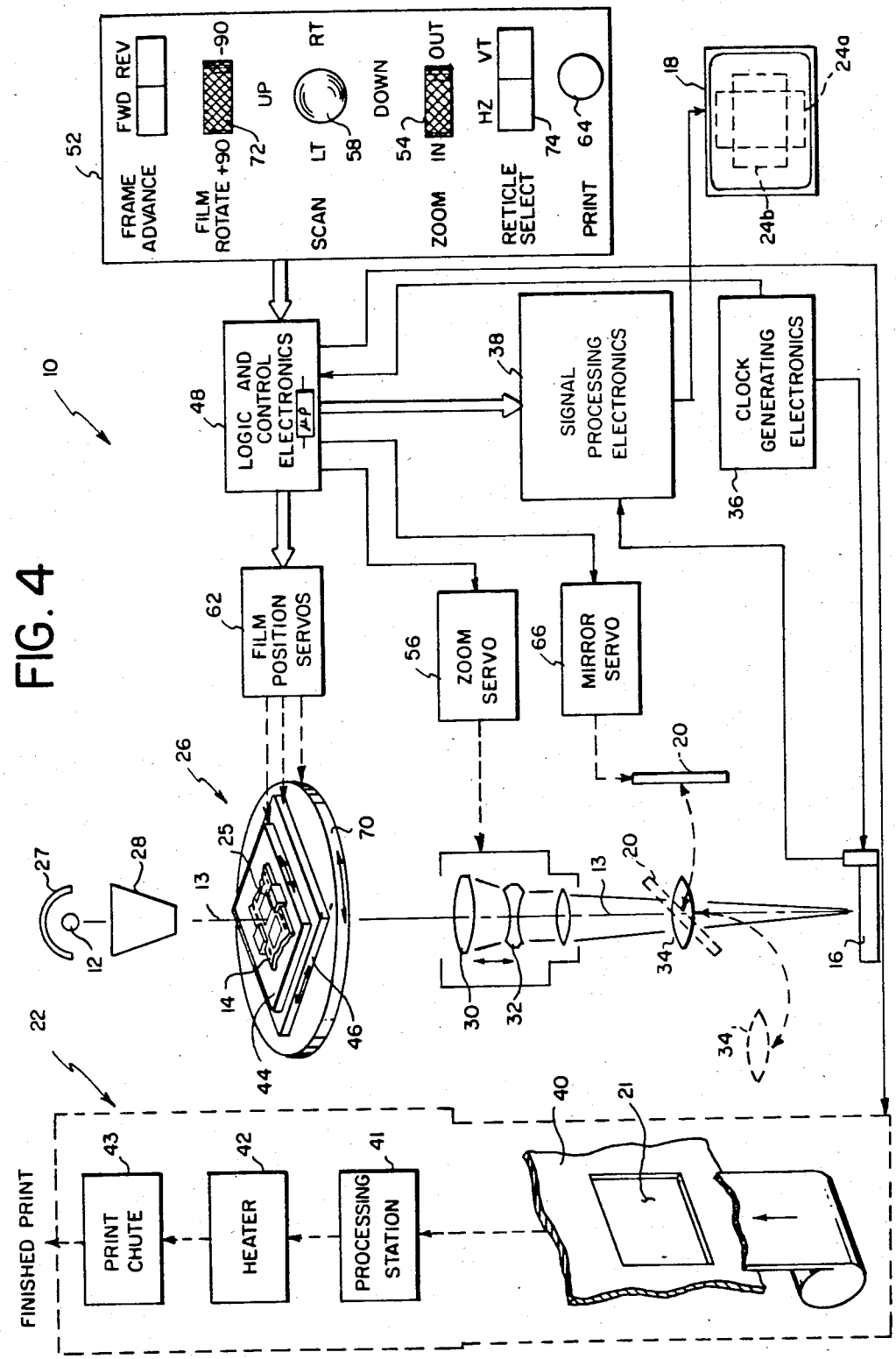
FIG. 4 is a schematic of a film video player/printer in accordance with the present invention.

FIG. 4 shows in greater detail the film video player/printer 10 according to the present invention. Elements of the apparatus of FIG. 4 that are structurally or functionally equivalent to the elements of FIG. 1 are identified by like numerals.

The film video player/printer 10 of FIG. 4 includes the light source 12 for periodically illuminating a 35 mm color negative photographic film 14, which is located in a film gate 25 on a movable platform, designated generally 26. A flash reflector 27, adjacent the light source 12, directs reflected flash light through an integrating bar 28, which functions to spread the light so that there are no illumination discontinuities over the film plane.

In the video display mode, a zoom lens 30, having a movable element 32, projects an image of the illuminated film 14 via a taking lens 34 onto the solid state image sensor 16.

The zoom lens 30 features a range of magnification so that at its lowest magnification the film image just fills the image sensor 16, and at its highest magnification, the resolution of the magnified image on the image sensor is substantially equal to the resolution of a standard television. The ratio of the dimensions of the screen of the video monitor 18 is the same as the ratio of the corresponding dimensions of the image sensor 16. The film image may be zoomed so that less of the image falls on the image sensor 16.

Clock generating electronics 36 serve to control the image sensor 16 to produce, in a known manner, a signal corresponding to the film image projected onto the sensor. An image sensor of the aforementioned type is disclosed in U.S. Pat. No. 4,495,516, assigned to the assignee of the present invention, the disclosure of which is incorporated herein by reference.

Signal processing electronics 38 receive the output of the sensor 16 corresponding to the film image, and produce a "positive" video signal, to display a positive image of the film 14 on the video monitor 18. The signal processing electronics 38 also function, under control of an operator, to superimpose the reticle selected (24a or 24b) on the video image of the film and to blank the video display outside of the reticle, prior to the making of a photographic print.

In the photographic print mode, a movable carrier plate (not shown) positions the aforementioned reflecting mirror 20 in the optical path of the light source 12, thereby altering the light path away from the image sensor 16. The mirror 20 serves to deflect flash light, projected via the film 14, through print filters and a shutter (not shown) onto the printing material 21, which is located at an exposure plane 40 of the printer 22. After passing through a processing station 41, the printing material 21 enters a heater 42, which serves to accelerate the printing cycle. The heater 42 feeds the heated strip of printing material 21 to a print exit chute 43, which delivers a finished photographic print to a customer.

The platform 26 of the player/printer 10 features an X-Y translation stage for moving the film 14 horizontally and/or vertically, to selectively crop the film image. For that purpose, the X-Y translation stage includes a first platform 44, which carries the film 14, movable in the longitudinal direction of the film, and a second platform 46, which carries a platform 44, movable parallel to the film in a direction perpendicular to its length.

Microprocessor-based logic and control electronics 48 serve to control the film video player/printer 10 via operator input provided through a control panel 52. For the purpose of controlling the zoom lens 30, an operator rotates a knurled zoom wheel 54 in a desired direction of magnification. In response to the actuation of the wheel 54, the logic and control electronics 48 cause a zoom servo 56, comprising a stepper motor, to drive the lens 32 in the appropriate direction.

To crop the film image, the operator rotates an omnidirectional control ball 58 in a desired direction; and in response to the amount and the direction of the rotation of the ball 58, the logic and control electronics 48 cause a pair of film position servos 62, each of which comprises a stepper motor, to drive a corresponding one of the platforms 44 and 46 in the appropriate direction.

The control panel 52 further includes a print button 64. The logic and control electronics 48, in response to the actuation of the print button 64, cause the printer 22 to make a print corresponding to the video image within the reticle displayed. For that purpose, a stepper motor of a mirror servor 66 suitably positions the mirror 20.

A rotary stage of the platform 26, in the form of a turntable 70, which carries the aforementioned X-Y translation stage, serves to rotate the film 14 about the optical centerline 13, independently of the X-Y translation stage. For the purpose of controlling the turntable 70, an operator actuates a knurled control wheel 72 (or push button) of the control panel 52, to achieve a desired direction of rotation. In response to the actuation of the wheel 72, the logic and control electronics 48 cause a film position servo 62 corresponding to the rotary stage to rotate the turntable 70 the appropriate amount and in the appropriate direction.

As described previously herein, when cropping a film image it is desirable to view not only that which is to be printed, but that which is to be excluded, to evaluate the overall effectiveness of the crop. Also as described, the background art relating to film video player/printer apparatus having cropping capability has suffered from a disadvantage in limiting the video display to that which is to be printed—failing to display beyond the actual image to be printed.

Figure 5:
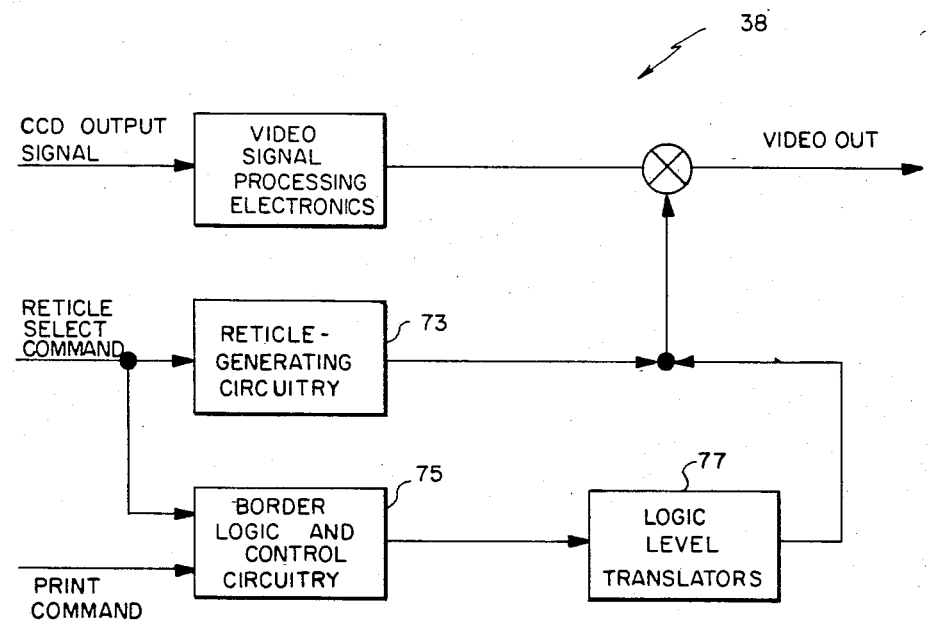
FIG. 5 is a more detailed block diagram of a portion of the signal processing electronics of the film video player/printer.

To overcome that disadvantage, the signal processing electronics 38 of a preferred embodiment of the invention include, as shown in FIG. 5, reticle-generating circuitry 73 for electronically generating the horizontally or vertically oriented rectangular reticle 24(a,b) centered on the screen of the video monitor 18. To that end, the signal processing electronics 38 receive through the logic and control electronics 48 a reticle select command from a control 74 of the control panel 52 corresponding to the orientation of the reticle selected. In response to that command, the reticle-generating circuitry 73 modifies the output video signal of the signal processing circuitry 38, to superimpose the reticle selected on the video image displayed. Video circuitry for generating predetermined displays are well known in the art, as exemplified by U.S. Pat. No. 3,345,458, the disclosure of which is incorporated herein by reference.

When the operator actuates the print button 64 to make a print of the image within the reticle displayed, border logic and control circuitry 75 of the signal processing electronics 38 receives a signal representing the print command from the logic and control electronics 48. In response to that signal, the border logic and control circuitry 75 functions to blank-out the video image byond the reticle displayed. For that purpose, the control circuitry 75 provides blanking signals to logic level translators 77, to suppress the video in the TV scanning pattern for the appropriate picture elements of the monitor 18. Video circuits for blanking selected portions of a video display are well known in the art, as exemplified by the aforementioned U.S. Pat. No. 3,345,458 and U.S. Pat. No. 3,728,481, the disclosure of which is also incorporated herein by reference.

When the print button 64 is actuated, the logic and control electronics 48, under the control of its microprocessor, provide an appropriate delay, to allow the operator to evaluate the image with the video blanked beyond the reticle displayed. After an appropriate evaluation period, the printer 22 operates to make a print. To that end, the logic and control electronics 48, based on an input corresponding to the reticle selected, cause the rotatable platform 70 to automatically position the film 14 for a print corresponding to the video image, in the format portrayed by the reticle displayed. To that end, the printer 22 and the film 14 are arranged with respect to each other so that only the portion of a normally oriented image that fills the reticle displayed is printed.

The operation of the film video player/printer 10, and the function of the logic and control electronics 48 will now be described with reference to the illustrations of FIG. 6.

Example No. I of FIG. 6 illustrates the case when an original is in a horizontal format and the operator selects the horizontal reticle 24b to portray the format of the image displayed. Under operator control through the zoom wheel 54 and the control ball 58, the film image to be printed is magnified and composed within the reticle 24b. In this situation, the printer 22, in response to an operator print command through the print button 64, makes a print corresponding to the composition and format of the image displayed, with the film 14 positioned for printing exactly as it was positioned for the video display.

Example No. II of FIG. 5 illustrates the case where the original is in a horizontal format and the operator selects the vertical reticle 24a to portray a vertical format of the image displayed. After composing and zooming for display, the logic and control electronics 48, in response to a print command, cause the film position servo 62 to rotate the platform 70 automatically by 90°, to position the film 14 for an optical print of a vertical format of the image displayed. Because the film 14 is rotated about the optical centerline 13 and because the vertical reticle 24a has the same area, but reciprocal aspect ratio as the horizontal reticle 24b, the printer 22 makes a vertical format print, without need for any cropping or zooming, respectively, subsequent to the rotation of the film for printing.

Example No. III of FIG. 5 illustrates the case where the original is in a vertical format and the operator selects the vertical reticle 24a, to portray the image displayed in the format of the original. When the original is in a vertical format, the operator actuates the control wheel 72, to cause the appropritae film position servo 62 to rotate the platform 70 by 90°, so that the film image is displayed in a normal operator-viewing position. After composing and zooming, the logic and control electronics 48, in response to an operator print command, then cause the platform 70 to automatically rotate the film in the reverse direction 90°, to reposition the film 14 for a print of a vertical format. Again, no zooming or cropping is necessary, subsequent to the rotation of the film for printing, for the print to correspond to the image displayed.

The final example of FIG. 5 illustrates the case where the original is in a vertical format and the operator selects the horizontal reticle 24b to portray the image displayed. With the original in a vertical format, the wheel 82, under operator control, causes the film 14 to rotate by 90°, so that the film image is displayed in a normal viewing position. Following composing and zooming, the logic and control electronics 48, in response to a print command, cause the printer 22 to make a print of the image displayed, with the film positioned exactly as required for the display.

By rotating only the film and/or a reticle portraying the format of a film image displayed, while fixing the position of the image sensor 16, the print material 21, and the video monitor 18, all possible arrangements of the film image are displayed in a normal viewing orientation, with the complexity of the film video player/printer 10 kept to a minimum. With this minimal complexity, a print is obtained of exactly the image and format portrayed, without any need to zoom or crop, to compensate for the positioning of the film for a print corresponding to the video display.

The invention has been described in detail with reference to the figures, however, it will be appreciated that variations and modifications are possible within the spirit and scope of the invention. Subject matter disclosed but not claimed herein is disclosed and claimed in the copending application of M. DiPietro et al, Ser. No. 770,120 filed on even date herewith.

What is claimed is:

1. In a film video player having photographic printer means for making an optical print corresponding to a film image displayed on a video monitor, the improvement comprising:
   electronic display means for displaying a rectangular reticle on said monitor within the border of the image displayed, the perimeter of the reticle encompassing the portion of the film image displayed that is to be printed.

2. A film video player as defined in claim 1 wherein said electronic display means further includes blanking circuitry, operable prior to a photographic printing operation, for blanking out the portion of the image displayed that is not encompassed by the reticle, to evaluate the optical print to be made by displaying only the portion of the film image that is to be printed.

3. In a film video player having photographic printer means for making an optical print corresponding to a film image displayed on a video monitor, the improvement comprising:
   electronic display means for displaying and rotating a given rectangular reticle centered within the border of the image displayed on said video monitor, the perimeter and the orientation of the reticle defining respectively the portion of the film image displayed that is to be printed and the format of the print to be made.

4. A film video player as defined in claim 3 including cropping means for translating an image of the film along either of the two orthogonal directions, to change the portion of the film image that is displayed on said video monitor.

5. A film video player as defined in claim 4 including zoom means for varying the magnification of the film image displayed.

6. In a film video player having photographic printer means for making an optical print corresponding to a film image displayed on a video monitor, the improvement comprising:
   electronic display means for selectively superimposing on said video monitor (1) a first rectangular reticle having a first oriented position corresponding to a vertical format of a print to be made, and (2) a second rectangular reticle having a second oriented position corresponding to a horizontal format of a print to be made, the perimeter and the orientation of the reticle selected defining, respectively, the portion of the film image displayed that is to be printed and the format of the print to be made.

7. A film video player as defined in claim 6 wherein the area of the first reticle is the same as the area of the second reticle.

8. A film video player as defined in claim 7 wherein the aspect ratio of the first reticle is the reciprocal of the aspect ratio of the second reticle.

9. A film video player as defined in claim 6 wherein said electronic display means includes border control and logic circuitry, operable prior to a photographic printing operation, for blanking out the image displayed outside the reticle selected, to evaluate the optical print to be made by displaying only the portion of the image to be printed.

* * * * *